(12) United States Patent
Kumar et al.

(10) Patent No.: US 8,798,902 B2
(45) Date of Patent: Aug. 5, 2014

(54) SYSTEM, METHOD AND COMPUTER SOFTWARE CODE FOR OBTAINING INFORMATION FOR ROUTING A POWERED SYSTEM AND ADJUSTING A ROUTE IN ACCORDANCE WITH RELEVANT INFORMATION

(75) Inventors: Ajith Kuttannair Kumar, Erie, PA (US); Glenn Robert Shaffer, Erie, PA (US); Vishram Vinayak Nandedkar, Bangalore (IN); Patricia Sue Lacy, Edinboro, PA (US); Kevin Kapp, Melbourne, FL (US); Eric Vorndran, Melbourne, FL (US); Daniel Pagano, Melbourne, FL (US); Parameswaran Shanmugam, Bangalore (IN); Ryan Goes, Erie, PA (US)

(73) Assignee: General Electric Company, Schenectady, NY (US)

( * ) Notice: Subject to any disclaimer, the term of this patent is extended or adjusted under 35 U.S.C. 154(b) by 832 days.

(21) Appl. No.: 12/364,648

(22) Filed: Feb. 3, 2009

(65) Prior Publication Data
US 2009/0198391 A1     Aug. 6, 2009

Related U.S. Application Data

(60) Provisional application No. 61/026,450, filed on Feb. 5, 2008.

(51) Int. Cl.
*G01C 21/30* (2006.01)
*B60L 3/12* (2006.01)

(52) U.S. Cl.
CPC ............... *B60L 3/12* (2013.01); *B60L 2200/26* (2013.01)
USPC .......................................................... 701/208

(58) Field of Classification Search
USPC ................................. 701/19, 200, 201, 206, 2
See application file for complete search history.

(56) References Cited

U.S. PATENT DOCUMENTS

| | | | | |
|---|---|---|---|---|
| 3,886,870 A * | 6/1975 | Pelabon | ........................ | 105/61.5 |
| 5,797,113 A * | 8/1998 | Kambe et al. | ................. | 701/467 |
| 5,902,341 A * | 5/1999 | Wilson | ..................... | 342/357.34 |
| 6,349,258 B1* | 2/2002 | Bonhoure et al. | ............ | 701/528 |
| 6,374,184 B1* | 4/2002 | Zahm et al. | ................... | 701/480 |
| 6,480,766 B2 | 11/2002 | Hawthorne et al. | | |
| 6,915,191 B2 | 7/2005 | Kane et al. | | |
| 7,028,955 B2 | 4/2006 | Young et al. | | |
| 2004/0107028 A1* | 6/2004 | Catalano | .......................... | 701/2 |
| 2005/0216184 A1* | 9/2005 | Ehlers | .......................... | 701/200 |
| 2006/0253234 A1* | 11/2006 | Kane et al. | ...................... | 701/19 |
| 2007/0137514 A1* | 6/2007 | Kumar et al. | .............. | 105/26.05 |
| 2008/0022966 A1* | 1/2008 | Tamma et al. | ................ | 123/299 |
| 2008/0033605 A1* | 2/2008 | Daum et al. | .................... | 701/19 |
| 2008/0082223 A1* | 4/2008 | Daum et al. | .................... | 701/19 |

\* cited by examiner

*Primary Examiner* — Elaine Gort
*Assistant Examiner* — Edward Winston, III
(74) *Attorney, Agent, or Firm* — GE Global Patent Operation; John A. Kramer

(57) ABSTRACT

A method for controlling a powered system, the method including operating the powered system to perform a mission based on an optimized mission plan, identifying when the powered system is approaching a location in the mission where the powered system may change from a first route to a second route, obtaining information about whether the first route or the second route will be taken, and if the second route is taken, adjusting the mission plan to optimize reduced emissions output and/or reduced fuel consumption based on the route change.

23 Claims, 8 Drawing Sheets

SYSTEM, METHOD AND COMPUTER SOFTWARE CODE FOR OBTAINING INFORMATION FOR ROUTING A POWERED SYSTEM AND ADJUSTING A ROUTE IN ACCORDANCE WITH RELEVANT INFORMATION

CROSS-REFERENCE TO RELATED APPLICATIONS

This application claims the benefit of U.S. Provisional Application No. 61/026,450 filed Feb. 5, 2008, and incorporated herein by reference in its entirety.

BACKGROUND OF THE INVENTION

The field of invention relates to powered systems and, more specifically, to using route information to reduce emissions and/or fuel consumption though optimized route planning.

Powered systems include off-highway vehicles, marine vessels, stationary power generation units, trains and other rail vehicles, agricultural vehicles, transport vehicles, and the like. Powered systems are usually powered by a power unit, such as, a diesel engine or other engine. With respect to rail vehicle systems, the powered system is a locomotive, which may be part of a train that further includes a plurality of rail cars, such as freight cars. Usually more than one locomotive is provided as part of the train, where a grouping of locomotives controlled together is referred to as a locomotive "consist." Locomotives are complex systems with numerous subsystems, with each subsystem being interdependent on other subsystems.

An operator is usually aboard a locomotive to ensure the proper operation of the locomotive, and when there is a locomotive consist, the operator is usually aboard a lead locomotive. In addition to insuring proper operations of the locomotive, or locomotive consist, the operator also is responsible for determining operating speeds of the train and forces within the train. To perform this function, the operator generally must have extensive experience with operating the locomotive and various trains over the specified terrain. This knowledge is needed to comply with prescribed operating speeds that may vary with the train location along the track. Moreover, the operator is also responsible for ensuring in-train forces remain within acceptable limits.

However, even with knowledge to ensure safe operation, the operator cannot usually operate the locomotive so that the fuel consumption and emissions is minimized for each trip. For example, other factors that must be considered may include emission output, operator's environmental conditions like noise/vibration, a weighted combination of fuel consumption and emissions output, etc. This is difficult to do since, as an example, the size and loading of trains vary, locomotives and their fuel/emissions characteristics are different, the location of the train varies, and weather and traffic conditions vary.

To reduce fuel consumption and emissions, some trains and other powered systems may use a trip optimizer or trip planner system, fuel saving system, speed control system, or other train control system. Trip optimizer systems, for example, incorporate (or otherwise utilize) information about the powered system and the mission of the powered system (e.g., vehicle route data) into a mission/trip plan. The mission plan provides control settings (such as propulsion and braking commands) for the powered system along the route or other mission. The powered system is controlled according to the mission plan, either automatically or by the trip optimizer system suggesting the control settings to the operator of the powered system.

In the case of a vehicle, it may be possible for the vehicle to travel along alternate routes, that is, the vehicle may start along one route and then switch to another route, even if the final destination does not change. For example, in the case of a train, the train may switch from one set of tracks to another set of tracks, e.g., a siding, for a meet and pass with another train, or to avoid areas of track maintenance. Switching routes will typically result in a previously generated mission plan no longer being optimally valid. However, providing information about the new route to the trip optimizer system has heretofore involved automatic radio communications from wayside equipment to the train (or other powered system), which is expensive to implement.

Additionally, rail vehicles are routinely assigned to a particular track, usually in the form of a track number, typically for purposes of movement planning, such as scheduling a route. Further, some train control systems enforce control signals for controlling the rail vehicle at distinct areas along particular tracks. Thus, if a train control system is not aware of the rail vehicle's properly assigned track number, and whether this number coincides with the track that the rail vehicle is currently on, the train control system has little certainty it is enforcing the correct control signals for that rail vehicle.

Furthermore, with implementation of a trip optimization system and/or software aboard rail vehicles, a track database is typically utilized in optimizing the trip planning process and to ensure that the plan is followed during the designated trip. Because of its use in the trip optimization system and/or software, the integrity of the track database specific to a certain track is critical. When databases are currently updated, the update usually involves providing a completely new database that includes both existing data as well as the new/modified data. Such updates may be time consuming in view of the size of the database and/or bandwidth available for delivery of the new database.

The updates to the database are provided from a remote location. Systems at the remote location may not be readily compatible with the rail vehicle. Towards this end, cost and time are required to modify or augment the software and/or communication system to provide the information to the rail vehicle.

As the rail vehicle is progressing along a mission, slow orders (i.e., atypical speed limit changes) may be provided to the rail vehicle. More specifically, all track speed limits must be obeyed. However, at times railroads may issue temporary speed limits, which are known as slow orders. These orders are not available in a typical database, but such orders must still be considered.

Some methods are currently available to assist in identifying a rail vehicle's current track number, or which track a rail vehicles is on when adjacent tracks are proximate the track upon which the rail vehicle is traveling. However, these methods have significant shortcomings, particularly in multiple-track regions, where rail vehicles typically initiate motion and require identification of their track number. For example, wayside equipment such as axle counters and track circuits require significant maintenance, which is undesirable in certain areas, including multiple-track regions. Additionally, low cost GPS technology has been used in conjunction with track switch direction to support identification of a rail vehicle track number. However, such technology only provides meaningful identification of the rail vehicle track number in single track areas or requires the train to move before being able to determine the correct track assignment. Thus, many current train control systems are not equipped to identify the rail vehicle track number in a multiple track area, and thus the rail vehicle operator must manually determine the track number in the multiple track area by radio, visually, or by pure speculation.

Since route/mission information that may be used to optimize a mission plan is beneficial, owners and operators of powered systems would realize benefits, such as but not limited to financial benefits, from an approach which results in only new/modified data being transmitted to the powered system, wherein the existing database is simply augmented with the new/modified data. Additionally, owners and operators would benefit from an approach that provides for delivering information, such as but not limited to manifest and/or route information, from a remote facility to a powered system where a modification to an information technology system aboard the powered system is not required. With respect to mission changes, or slow orders, an approach is needed that ensures that slow orders are implemented for any trip where the slow orders are not permanently infused into a trip database. For powered systems that have defined mission routes, such as a train operating on tracks, it would be advantageous to provide a system capable of identifying a track number in a multiple track area, thereby permitting accurate enforcement of signals for a powered system control system from the time that the powered system moves from the multiple track area and outwardly along its route.

BRIEF DESCRIPTION OF THE INVENTION

Embodiments of the present invention relate to a system, method and a computer readable media for controlling a powered system, e.g., for reducing emissions and/or fuel consumption through utilization of route information to optimize route planning. The method includes operating the powered system to perform a mission based on an optimized mission plan. The method further includes identifying when the powered system is approaching a location in the mission where the powered system may change from a first route to a second route. Information is obtained about whether the first route or the second route will be taken. If the second route is taken, the mission plan is adjusted to optimize reduced emissions output and/or reduced fuel consumption based on the route change.

In another embodiment, the system includes a subsystem configured to determine a specific location of the powered system along a first mission route, wherein the subsystem is further configured to determine, based on the determined specific location of the powered system, when the powered system is approaching a location where the powered system is able to change from the first mission route to a second, different mission route.

In yet another embodiment, the computer software code is stored on a computer readable media and is executed with a processor. The computer software code includes a computer software module for operating the powered system to perform a mission based on an optimized mission plan, when executed with the processor. A computer software module is further disclosed for identifying when the powered system is approaching a location in the mission where the powered system may change from a first mission route to a second mission route, when executed with the processor. A computer software module is also disclosed for obtaining information about whether the first mission route or the second mission route will be taken, when executed with the processor. If the mission second route is taken, a computer software module is provided for adjusting the mission plan to optimize reduced emission output and/or reduced fuel consumption based on the mission route change (e.g., change from the first mission route to the second mission route), when executed with the processor.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

Figure 1:
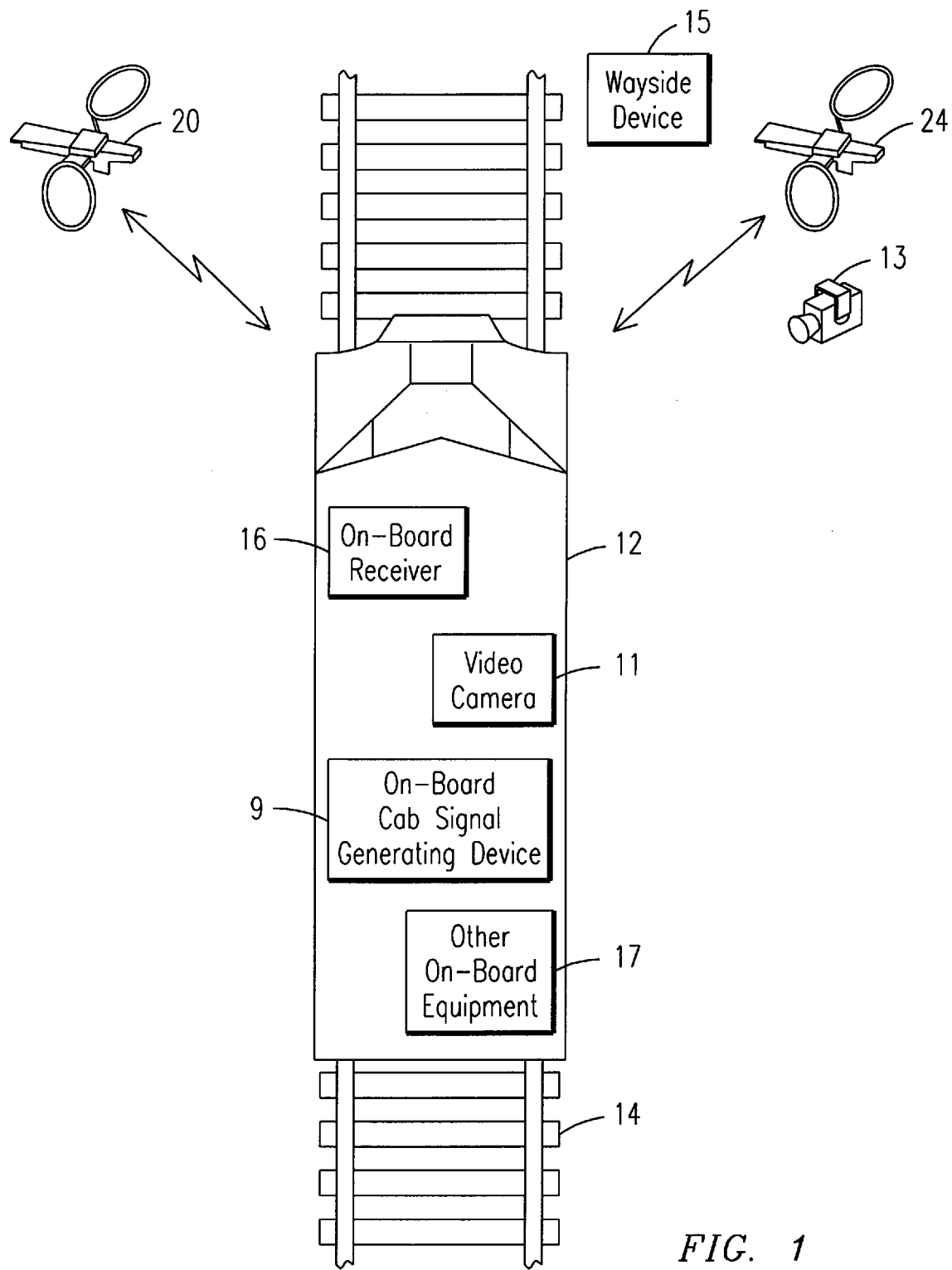
FIG. 1 depicts an exemplary embodiment of a system for identifying the track assignment of a rail vehicle traveling along a track based on at least one of active determination and reactive determination.

Reference will be made below in detail to exemplary embodiments of the invention, examples of which are illustrated in the accompanying drawings. Wherever possible, the same reference numerals used throughout the drawings refer to the same or like parts. As disclosed below, multiple versions of a same element may be disclosed. Likewise, with respect to other elements, a singular version is disclosed. Neither multiple versions disclosed nor a singular version disclosed shall be considered limiting. Specifically, though multiple versions are disclosed a singular version may be utilized. Likewise, where a singular version is disclosed, multiple versions may be utilized.

Though exemplary embodiments of the present invention are described with respect to rail vehicles, or railway transportation systems, specifically trains and locomotives, exemplary embodiments of the invention are also applicable for use with other powered systems, such as but not limited to marine vessels, stationary power generation units, off-highway vehicles, and other vehicles such as agricultural vehicles, each which may use at least one engine. Towards this end, when discussing a specified mission, this includes a task or requirement to be performed by the powered system. Therefore, with respect to a railway vehicle, marine vessel, agricultural vehicle, or off-highway vehicle applications, this may refer to the movement of the collective powered system from a present location to a destination. In the case of stationary applications, such as but not limited to a stationary power generating station or network of power generating stations, a specified mission may refer to an amount of wattage (e.g., MW/hr) or other parameter or requirement to be satisfied by the powered system.

Though diesel powered systems are readily recognized when discussing trains or locomotives, those skilled in the art will readily recognize that embodiments of the invention may also be utilized with non-diesel powered systems, such as but not limited to natural gas powered systems, bio-diesel powered systems, etc. Furthermore, the individual powered system may include multiple engines, other power sources, and/or additional power sources, such as, but not limited to, battery sources, voltage sources (such as but not limited to capacitors), chemical sources, pressure based sources (such as but not limited to spring and/or hydraulic expansion), electrical current sources (such as but not limited to inductors), inertial sources (such as but not limited to flywheel devices), gravitational-based power sources, and/or thermal-based power sources.

Exemplary embodiments of the invention solve problems in the art by providing a system, method, and computer implemented method, such as a computer software code or computer readable media, for reducing emissions and/or fuel consumption through utilization of route information to optimize route planning. With respect to locomotives, exemplary embodiments of the present invention are also operable when the locomotive consist is in distributed power operations. ("Distributed power" refers to controlling locomotives in concert for coordinated traction, e.g., coordinated propulsion and braking efforts.)

Throughout this document the term "locomotive consist" is used. As used herein, a locomotive consist may be described as having one or more locomotives in succession, connected together so as to provide motoring and/or braking capability. The locomotives are connected together where no train cars are in between the locomotives. The train can have more than one locomotive consists in its composition. Specifically, there can be a lead consist and one or more remote consists, such as midway in the line of cars and another remote consist at the end of the train. Each locomotive consist may have a first locomotive and trail locomotive(s). Though a first locomotive is usually viewed as the lead locomotive, those skilled in the art will readily recognize that the first locomotive in a multi locomotive consist may be physically located in a physically trailing position. Though a locomotive consist is usually viewed as involving successive locomotives, those skilled in the art will readily recognize that a consist group of locomotives may also be recognized as a consist even when one or more rail cars separate the locomotives, such as when the locomotive consist is configured for distributed power operation, wherein throttle and braking commands are relayed from the lead locomotive to the remote trains by a radio link or physical cable. Towards this end, the term locomotive consist should not be considered a limiting factor when discussing multiple locomotives within the same train.

As disclosed herein, the idea of a consist may also be applicable when referring to other types of powered systems including, but not limited to, marine vessels, off-highway vehicles, agricultural vehicles, and/or stationary power plants, that operate together so as to provide motoring, power generation, and/or braking capability. Therefore, even though the term locomotive consist is used herein in regards to certain illustrative embodiments, this term may also apply to other powered systems. Similarly, sub-consists may exist. For example, the powered system may have more than one power generating unit. For example, a power plant may have more than one diesel electric power unit where optimization may be at the sub-consist level. Likewise, a locomotive may have more than one diesel power unit.

Furthermore though the exemplary examples are disclosed with respect to a rail vehicle, such disclosures are not to be considered limiting. The exemplary embodiments are also applicable to other powered systems. Therefore, as an exemplary example, track and route are considered having the same meaning since a track defines a route taken by a rail vehicle.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk, computer readable media, or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, a technical effect is to reduce emissions output and/or fuel consumption through utilization of route information which will optimize route planning. To facilitate an understanding of the exemplary embodiments of the invention, it is described hereinafter with reference to specific implementations thereof. Exemplary embodiments of the invention may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that perform particular tasks or implement particular abstract data types. For example, the software programs that underlie exemplary embodiments of the invention can be coded in different programming languages, for use with different devices, or platforms. In the description that follows, examples of the invention may be described in the context of a web portal that employs a web browser. It will be appreciated, however, that the principles that underlie exemplary embodiments of the invention can be implemented with other types of computer software technologies as well.

Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through at least one communications network. In a distributed computing environment, program modules may be located in both local and remote computer storage media including memory storage devices.

Referring now to the drawings, embodiments of the present invention will be described. Exemplary embodiments of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

A plurality of concepts is possible for determining which track a rail vehicle is using when there is at least one adjacent track. At least two general approaches are available. One approach involves reactive determination, and another active determination.

With respect to a reactive approach, a determination of route change is made by an operator. For example, the operator is prompted at/near a switch point to identify which track the rail vehicle is upon. The timing of when the operator performs this task may occur at other times during a mission as well. For example, when a speed change has occurred and/or when there is an extended length of parallel tracks. In one embodiment the operator is prompted to identify the track, such as but not limited to either a visual and/or audible indicator. In another embodiment, the operator is actively involved with determining track designation and is aware of the circumstances, such as disclosed above, when to identify the track.

FIG. 1 depicts an exemplary embodiment of a system for identifying the track assignment of a rail vehicle traveling along a track based on at least one of active determination and reactive determination. As illustrated in FIG. 1, equipment may be used to make the track determination. Such equipment may include a global positioning system ("GPS") represented here by two satellites 20,24, an on-board video camera system 11, and/or an on-board cab signal generating device 9. The GPS system, represented by satellites 20,24, may use a change of average distance off the track 14 to determine the track designation. In another exemplary embodiment, disclosed in more detail below with respect to FIGS. 2 through 4, two antennas 28,30, at two ends of the rail vehicle 12 may be utilized. These approaches illustrate active approaches.

As further illustrated in FIG. 1, image processing of image data captured by the on-board video camera system 11 may be used to determine which track the rail vehicle 12 is upon. A remote unit video camera system 13 may be used to determine a shift in angle, or, in other words, viewing angle changes. This approach is reactive in nature. An active approach that may be used with the remote unit video camera system 13 involves using the video camera system 13 to determine a diverging aspect, such as by using light signals.

Additional on-board equipment 17 that may be utilized includes, but is not limited to, an accelerometer/electronic compass, a string pot to determine truck angle, a drawbar to determine force in a lateral direction, and/or a proximity sensor, such as to sense track stitches. Equipment that may be located on and/or off of the rail vehicle may include a device for receiving differential GPS signals, GPS information from another rail vehicle provided to the rail vehicle of interest, and/or a device providing switch position information. The device providing switch positioning information may include, but is not limited to, a switch position transmitter, information provided from a dispatch, and/or a signal source located in between the tracks.

Figure 2:
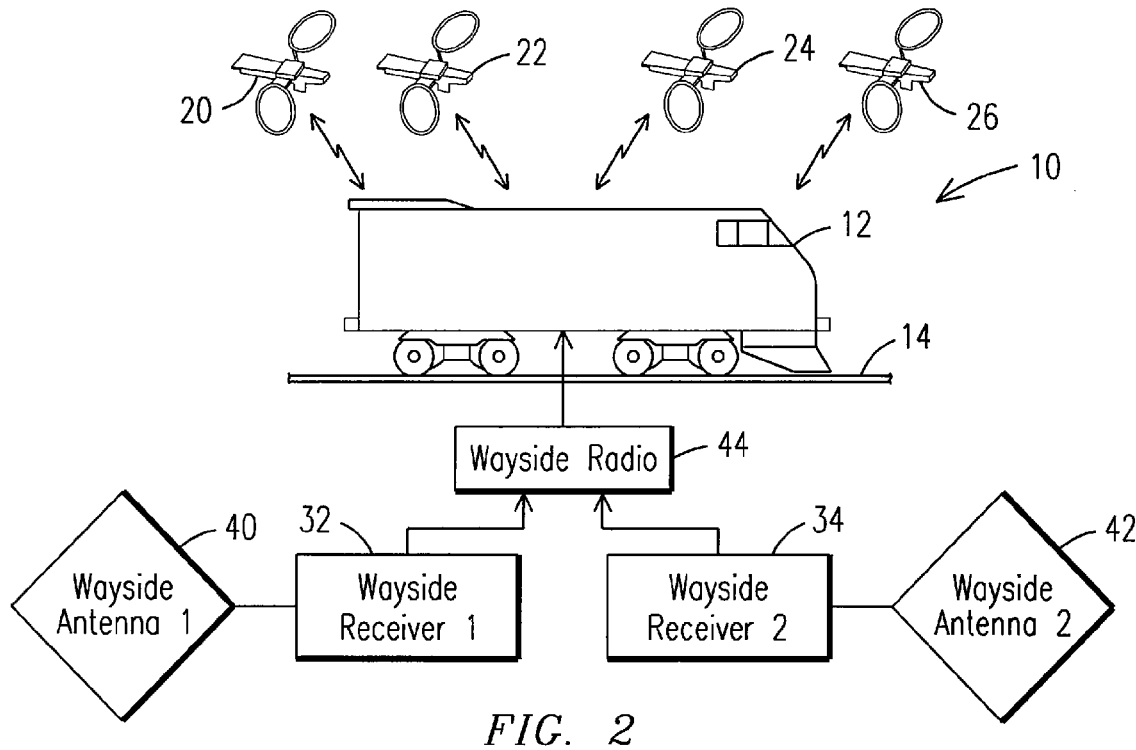
FIG. 2 depicts a schematic diagram of one exemplary embodiment of a system for identifying the track assignment of a rail vehicle.
Figure 3:
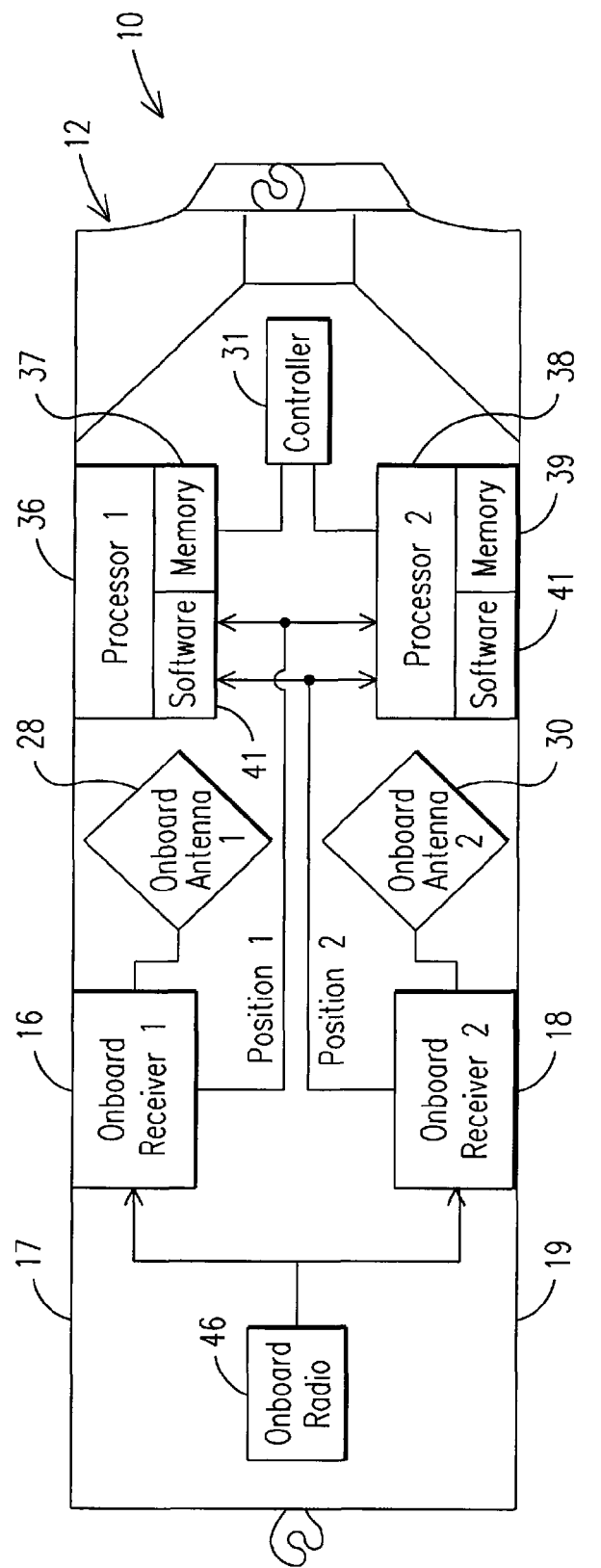
FIG. 3 depicts a partial schematic diagram of an exemplary embodiment of a system for identifying the track assignment of a rail vehicle.

FIGS. 2 and 3 illustrate a system 10 to identify the track assignment of a rail vehicle 12 traveling along a track 14, particularly in a multiple-track region. The track 14 may be one track among a plurality of tracks (e.g., parallel tracks) in such a multiple-track region, for example. In an exemplary embodiment of the invention, the track assignment used is a track identification parameter, such a track number, but other track assignments may be utilized and are within the scope of the subject invention.

As illustrated in the exemplary embodiment of FIG. 3, the system 10 includes a pair of onboard receivers 16,18, such as GPS rover receivers, for example, positioned onboard the rail vehicle 12 such that they are approximately symmetric with respect to the center-line of the track 14. Although FIG. 3 illustrates the onboard receivers 16,18 positioned adjacent to opposing long sides 17,19 of the rail vehicle 12, in another embodiment, the onboard receivers may be positioned adjacent to opposing ends of the rail vehicle, for example. In such an exemplary embodiment in which the onboard receivers are positioned at opposing ends of the rail vehicle 12, this arrangement may have various advantages, such as mitigating multi-path effects, for example.

The onboard receivers 16,18 wirelessly communicate with four GPS satellites 20,22,24,26 to provide a respective initial location of a respective onboard antenna 28,30. As is appreciated by one of skill in the art, the onboard receivers 16, 18 determine the initial location of each respective onboard antenna 28,30, such as a GPS rover antenna, for example, by determining the pseudorange from the onboard antennas 28,30 to each respective GPS satellite 20,22,24,26, and utilizing these values to approximate the latitude, longitude, height and time for each onboard antenna 28,30. In an exemplary embodiment of the system 10, the onboard receivers 16,18, and wayside receivers 32,34 (discussed in further detail below) either both exclusively utilize an L1 GPS satellite frequency or respectively utilize the L1 and L2 GPS satellite frequencies to determine the onboard antenna 28,30 positions, so to reduce or eliminate error sources attributed to, ephemeris errors, GPS satellite clock errors, and tropospheric effects, ionospheric effects, and other atmospheric effects, for example. However, the system 10 is not limited to the onboard receivers 16,18 and wayside receivers 32,34 (discussed below) utilizing the L1 and L2 GPS satellite frequencies, and may utilize any future available satellite GPS frequencies, or other GPS augmentation systems such as the Wide Area Augmentation System ("WAAS"), as appreciated by one of skill in the art. Although the pair of onboard receivers 16, 18 and their respective corresponding onboard antennas 28,30 are positioned as shown in FIG. 3, any number of onboard receivers and corresponding onboard antennas may be utilized and may be positioned at any location along the rail vehicle 12. In an exemplary embodiment of the system 10, when utilizing different GPS satellite frequencies for the onboard receivers 16,18 and wayside receivers 32,34 (discussed below), an accuracy in determining the position of the track 14 (and thus the identity of the track) with sufficient accuracy to discriminate between multiple tracks in multiple track areas where tracks are spaced apart by approximately fifteen feet is achieved, for example. In one exemplary embodiment, the system 10 is capable of determining the location of adjacent tracks which are separated by more than 6 feet (1.829 meters), for example, such as in a multiple track area.

Additionally, as illustrated in FIG. 2, the system 10 includes a pair of wayside receivers 32,34, such as a pair of GPS reference receivers, for example, coupled to a respective pair of wayside antennas 40,42. Prior to the wayside receivers 32,34 wirelessly communicating with the GPS satellites 20,22,24,26, the locations of each wayside antenna 40,42 are surveyed, including their respective latitude, longitude, and altitude. However, the actual location of the wayside antennas 40,42 may be determined by any acceptable method appreciated by one of skill in the art. The location of each wayside antenna 40,42 (determined by survey or other method) is then input into a respective wayside receiver 32,34. Upon entering the location of each wayside antenna, each wayside receiver 32,34 wirelessly communicates with each GPS satellite 20,22,24,26 to determine a measured location for each respective wayside antenna 40,42 based on a set of pseudoranges from the wayside antennas 40,42 to the GPS satellites 20,22,24,26. Each wayside receiver then evaluates the measured location for each antenna and the surveyed location to determine a pseudorange correction from the wayside antenna 40,42 to the GPS satellites 20,22,24,26, which is in-turn used to determine an error in the measured position. The measured location of the wayside antenna 40,42 may be enhanced by incorporating the pseudorange corrections into the pseudoranges from the wayside antenna 40,42 to the GPS satellites 20,22,24,26. In an exemplary embodiment of the system 10, the error in the measured position for each wayside antenna is used to determine a pseudorange correction for each GPS satellite 20,22,24,26. Although the pair of wayside receivers 32,34 and their respective corresponding wayside antennas 40,42 are positioned as shown in FIG. 2, a respective wayside receiver and wayside antenna are typically incrementally spaced along the rail vehicle track, and more than one pair of respective wayside receivers and wayside antennas may be positioned at each incremental location. In one exemplary embodiment of the system, each pair of wayside receivers and wayside antennas may be incrementally spaced every 30 miles (48.28 kilometers), for example. The wayside receivers 32,34 calculate a pseudorange correction to each GPS satellite 20,22,24,26 based on the measured error in the position of the wayside antennas 40,42 between the surveyed position and the GPS measured position. Thus, the pseudorange correction for each GPS satellite 20,22,24,26 is subsequently factored into the measured pseudorange to each GPS satellite, so to minimize the error of each GPS measurement. In the exemplary embodiment of FIGS. 2 and 3, the pair of wayside receivers 32,34 are collectively coupled to a wayside radio 44 adjacent to the track 14, and thereby collectively wirelessly communicate the pseudorange corrections of the respective GPS satellites 20,22,24,26 through the wayside radio to an onboard radio 46 positioned on the rail vehicle 12.

In an additional exemplary embodiment of the system 10, in place of the wayside receivers 32,34, the pseudorange corrections for each GPS satellite 20,22,24,26 to the onboard antennas 28,30 may be provided by one of a number of GPS satellite subscription services, as appreciated by one of skill in the art.

As illustrated in FIGS. 2-3, each respective wayside receiver 32,34 is wirelessly coupled (via a wayside radio 44) to the onboard receivers 16,18. The pseudorange correction determined by each respective wayside receiver 32,34, discussed above, is subsequently incorporated into the pseudoranges between the onboard antennas 28,30 and the GPS satellites 20,22,24,26 to provide a corrected location to the respective initial location of each onboard antenna 28,30 determined by the respective onboard receiver 16,18. Each wayside receiver 32,34 is illustratively positioned adjacent to the track 14 to wirelessly communicate with the rail vehicle 12 when the rail vehicle passes within a proximate distance of the wayside receivers 32,34. The wayside receivers 32,34 provide respective pseudorange corrections for the GPS satellites 20,22,24,26 used to determine the location of each onboard antenna 28,30, to the respective onboard receiver 16,18 of each onboard antenna 28,30. As discussed earlier, each pseudorange correction is based on the corrected location of the wayside antennas 40,42. Upon receiving the respective pseudorange correction of each onboard antenna 28,30 location, each onboard receiver 16,18 determines the corrected location of each onboard antenna 28,30 based upon the initial location of the onboard antennas and the pseudorange corrections provided by the wayside receivers. In an exemplary embodiment of the system 10, the corrected location for each onboard antenna 28,30 includes 4 pseudorange corrections for each of the 4 respective GPS satellite ranges. In another exemplary embodiment of the system, the onboard receivers 16,18 sample the wayside receivers 32,34 at regular time intervals for corrected locations for the respective onboard antennas 28,30 as the rail vehicle is traveling along the track 14, such as every 1 second, for example.

As illustrated in FIG. 3, a pair of processors 36,38 are coupled to each pair of onboard receivers 16,18 to receive each corrected location of each onboard antenna 28,30 from each respective onboard receiver 16,18. Upon each processor 36,38 receiving the corrected location of each onboard antenna 28,30, each processor averages the corrected locations of the onboard antennas, such as by passing the corrected locations through a Kalman filter, for example. Additionally, upon averaging the corrected locations of each onboard antenna 28,30, the system 10 provides a step where each processor 36,38 mutually compares its respective computed average to ensure the respective averages of the corrected locations of onboard antennas are equal, or within an acceptable range, for example. Additionally, each processor 36,38 may compare the respective corrected locations, to ensure that they fall within an acceptable geographic range, to determine that the system 10 is functioning correctly. By averaging the two onboard antenna locations, each processor maps the onboard antenna locations onto the track 14 location. In the event that one of an onboard receiver 16,18 or processor 36,38 in the system 10 fails, the other onboard receiver 16,18 and processor 36,38 of the pair still communicate to average the two onboard antenna locations. Although FIG. 3 illustrates a first embodiment of the system 10, including two processors 36,38, in a second embodiment the system utilizes one processor, one onboard receiver, and one onboard antenna on each rail vehicle, for example. In the second embodiment of the system, other devices such as an additional tachometer, for example, may be utilized to provide a backup for location determination. In the first embodiment of the system 10, a tachometer may be additionally utilized during instances of non-GPS reception, such as entering a tunnel for example, when monitoring rail vehicle speed may be used to determine the rail vehicle position and thereby continuously monitor the track position. In addition to a tachometer, other navigational aids may be utilized during instances of non-GPS reception, such as an accelerometer and/or a gyro, for example. In an exemplary embodiment of the system, upon mapping the corrected positions of each onboard antenna onto the track, the processors may use this to identify the rail vehicle track number by one of a number of ways. The processor(s) 36,38 may include a memory 37,39 in which the track identification numbers are stored for the range of latitude/longitude/altitude values, and the processor(s) 36,38 may determine the track identification number by looking up the average onboard antenna 28,30 latitude/longitude/altitude in the processor(s) memory 37,39, for example. In addition, the processor(s) 36,38 could send a track position signal to a central control station and receive a track identification signal confirming the correct identification of the track number.

Also illustrated in FIG. 3, a controller 31 is provided to control the rail vehicle 12. At least one of the processors 36,38 is able to provide control commands to the controller 31 and/or an operator. Computer-readable instructions 41, in form of software, are executed by the processor 36,39. When executed by the processor 36,39, the computer-readable instructions 41 cause the processor 36,39 to evaluate route changes, manifest information provided from a remote location, and a change to a route database. These factors are evaluated in for determining a mission plan (including adjusting an existing mission plan) that is optimized to provide for reduced emissions output and/or reduced fuel consumption. The controller 31 controls the powered system 12 in response to a change in the route, e.g., using the mission plan. In another exemplary embodiment the commands are relayed to the operator who then may decide whether to follow the commands.

Other devices or technology may be utilized to determine the location of the rail vehicle 12, and thus identify the track assignment of the rail vehicle 12, and are within the scope of the embodiments of the invention, including at least one of various wayside devices 15 (illustrated in FIG. 1), such as axle counters and track circuits, cab signals which provide a track identification to the rail vehicle, balise or tag reader devices that provide track identification to the train, train driver input via a user interface in the rail vehicle, track number designation by the dispatcher using a scheme that requires the rail vehicle to occupy blocks and report its location to the dispatcher, radar ranging technology, laser ranging technology, other global positioning systems such as Glo-Nass, Galileo, and associated GPS satellite based augmentations (WAAS, EGNOS, MSAS and other future augmentation systems).

Figure 4:
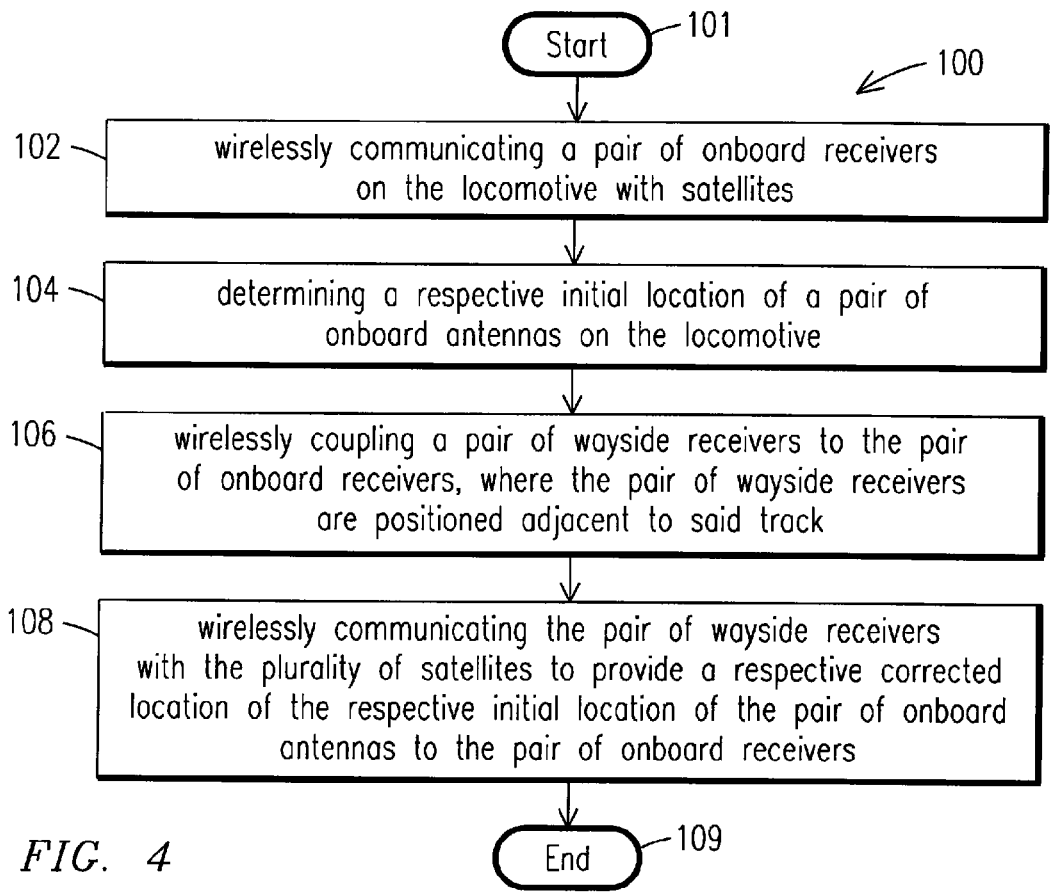
FIG. 4 depicts a flow chart illustrating an exemplary embodiment of a method for identifying the track assignment of a rail vehicle.

FIG. 4 illustrates an exemplary embodiment of a method 100 for identifying the track assignment of a rail vehicle 12 traveling along a track 14. The method 100 begins at 101 by the pair of onboard receivers 16,18 on the rail vehicle 12 wirelessly communicating 102 with a plurality of GPS satellites 20,22,24,26. The method 100 further includes determining 104 a respective initial location of the pair of onboard antennas 28,30 on the rail vehicle 12. The method 100 further includes wirelessly coupling 106 the pair of wayside receivers 32,34 to the pair of onboard receivers 16,18, where the pair of wayside receivers 32,34 are positioned adjacent to the track 14. The method 100 further includes the pair of wayside receivers 32,34 wirelessly communicating 108 with the GPS satellites 20,22,24,26 to provide a respective corrected location of the respective initial location of the pair of onboard antennas 28, 30 to the pair of onboard receivers 16,18, before ending at 109.

Figure 5:
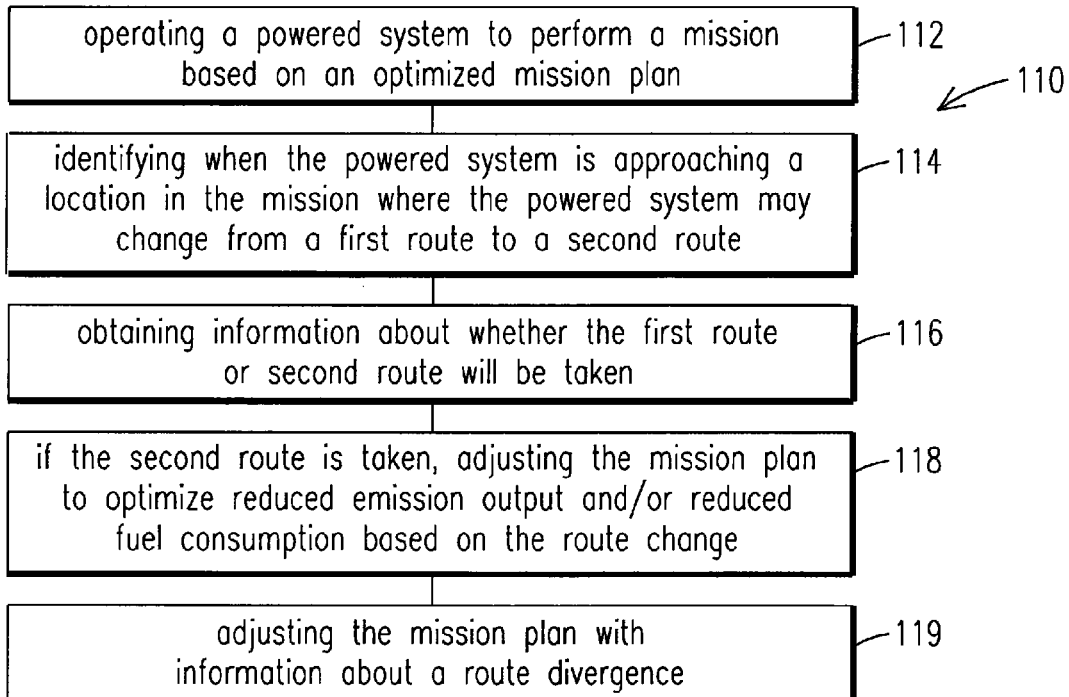
FIG. 5 depicts flowchart illustrating an exemplary embodiment of a method for adjusting an existing route based on information received regarding a route divergence.

FIG. 5 depicts a flowchart illustrating an exemplary embodiment of a method for adjusting an existing route based on information received regarding a route divergence. Those skilled in the art will readily recognize that "route divergence" is interchangeable with the term "route change". Therefore, route divergence is not meant to be a limiting term. Adjusting an existing route may result in a fuel savings and/or a reduction in emissions during a specific mission. Automatic speed control systems require information about speed limits and terrain along the route that the rail vehicle will take while traveling between its current location and its destination. Speed limits and/or terrain differ between the possible tracks, or routes, that can be used to route a train to a specific destination. Therefore, for an automatic speed control system to function properly, information about the planned route of the rail vehicle is required where based on such information a determination may be made as to the likely route of the rail vehicle from its current location to its destination. The flowchart 110 discloses operating a powered system to perform a mission based on an optimized mission plan, at 112. The method of flowchart 110 further includes identifying when the powered system is approaching a location in the mission where the powered system may change from a first route to a second route, at 114. (See, for example, the location 208 where route 204 diverges from route 202 in FIG. 14.) Information is obtained about whether the first route 202 or the second route 204 will be taken, at 116. If the second route 204 is taken, the mission plan is adjusted to optimize reduced emissions output and/or reduced fuel consumption based on the route change, at 118. The mission plan may be adjusted with information about a route divergence, at 119.

Figure 6:
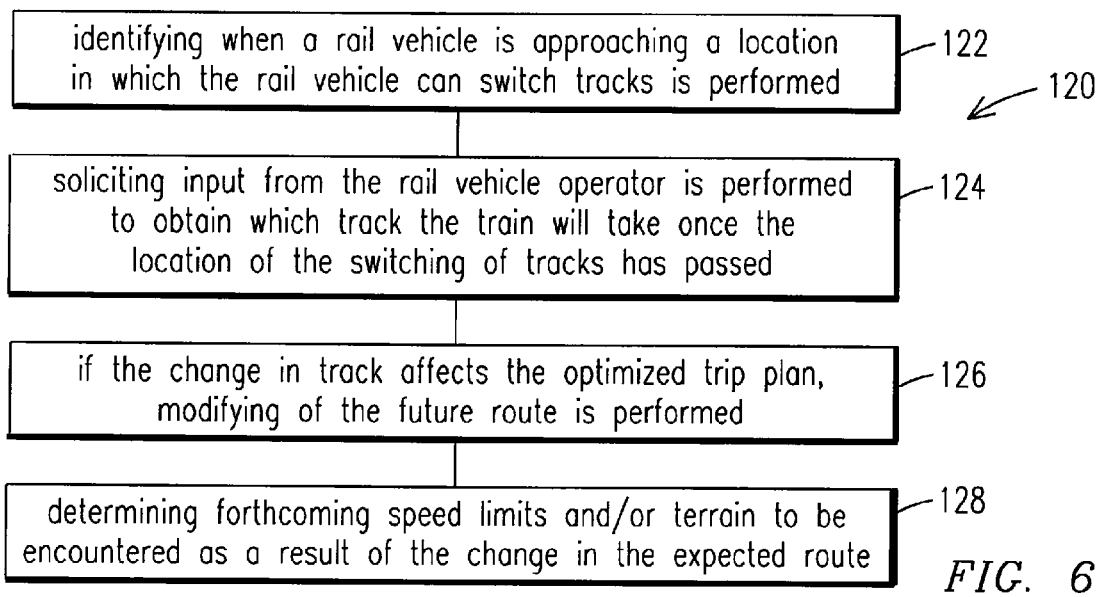
FIG. 6 depicts another flowchart illustrating an exemplary embodiment of a method for adjusting an existing route based on information received regarding a route divergence.

FIG. 6 depicts another flowchart illustrating an exemplary embodiment of a method for adjusting an existing route based on information received regarding a route divergence. The method, as illustrated in flowchart 120, comprises identifying when a rail vehicle is approaching a location in which the rail vehicle can switch tracks, at 122. The method further comprises soliciting input from the rail vehicle operator to obtain information about which track the train will take once the location of the switching of tracks has passed, at 124. If the change in track affects the optimized trip/mission plan, modifying of the future route is performed, at 126. (That is, the expected route of the rail vehicle is changed/modified based on operator input.) A determination is made with respect to speed limits and/or terrain to be encountered as a result of the change in the expected route, at 128. The mission plan may then be adjusted as at step 118 in FIG. 5.

Figure 7:
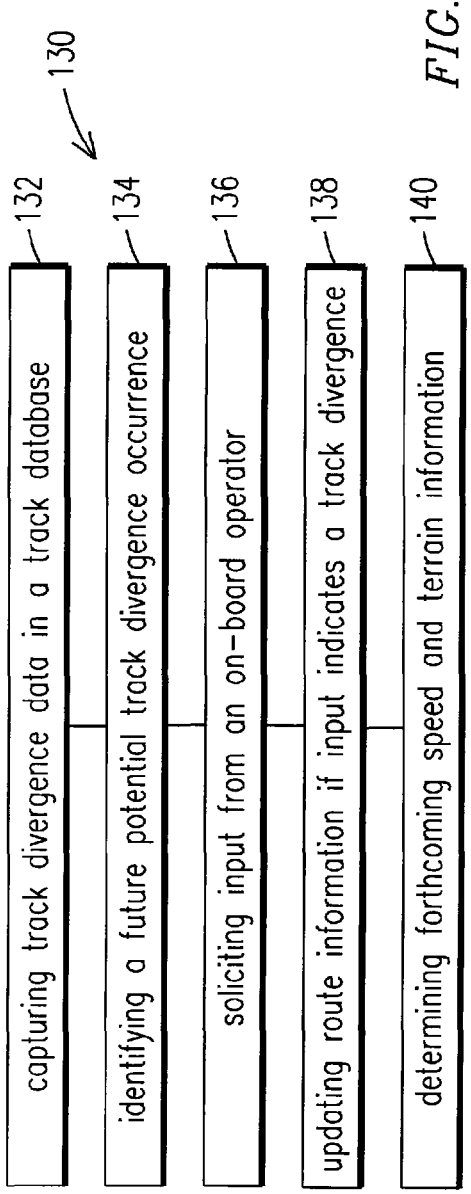
FIG. 7 depicts another flowchart illustrating an exemplary embodiment of a method for adjusting an existing route based on information received regarding a route divergence.

FIG. 7 depicts another flowchart illustrating an exemplary embodiment of a method for adjusting an existing route based on information received regarding a route divergence. As illustrated, the flowchart 130 discloses capturing route divergence data in a track database, at 132. (The database may be stored, for example, in memory 37 associated with processor 36.) The flowchart 130 uses the term "track." Though track is specific to a rail system which operates upon a railroad track, those skilled in the art will readily recognize that "track" is not limiting since it is meant to address a route. This provides an ability to define information about the location of a route divergence, such as but not limited to encountering a track switch and/or crossover to another track, in a database. This information includes but is not limited to location of the switch or crossover, a distance at which the operator could know which track is to be used beyond the switch, the designation of the track that the rail vehicle could be routed to beyond the switch, and/or a control point that contains the switch.

Identifying a future potential route divergence occurrence is also provided, at 134. This allows for monitoring a location of the rail vehicle on the track. Then the track database is used to determine if the rail vehicle is approaching a potential route divergence location. Input from the operator and/or the system, which determines the track or route the rail vehicle is occupying, as disclosed above, is solicited at a location at which the operator will know which track will be used, at 136. In an exemplary embodiment, based on the rail vehicle's location a query is transmitted to the operator and/or system to respond. The response is then evaluated. The route information is then updated if the input indicates a route divergence, at 138. Future speed and terrain information is then determined once the new expected route is determined, at 140. The new speed limit and terrain information support fuel savings and/or emissions output savings, and automatic speed control of the rail vehicle. For example, information about the new expected route may be used to adjust a mission plan, as at step 118 in FIG. 5.

The methods of flowcharts 110,120,130 illustrated in FIGS. 5-7 may be performed with a computer software code having computer software modules where the computer software code is stored on computer media and is executed with a processor 36,38 as illustrated in FIG. 3. For example, the processor 36,38 may be one configured to specifically handle track database processing including maintaining and verifying integrity of the track database. Those skilled in the art will also recognize that the processor used to implement these methods is not a generic computer. Specifically, the processor is unique to operate within an environment that it is exposed to when part of the powered system. Furthermore, the processor may have additional functions, such as but not limited to autonomously or nearly autonomously operating the powered system. Furthermore, since an operator is in ultimate control of the powered system, the processor must also be able to report decisions made by the processor and/or operating conditions to the operator.

Figure 14:
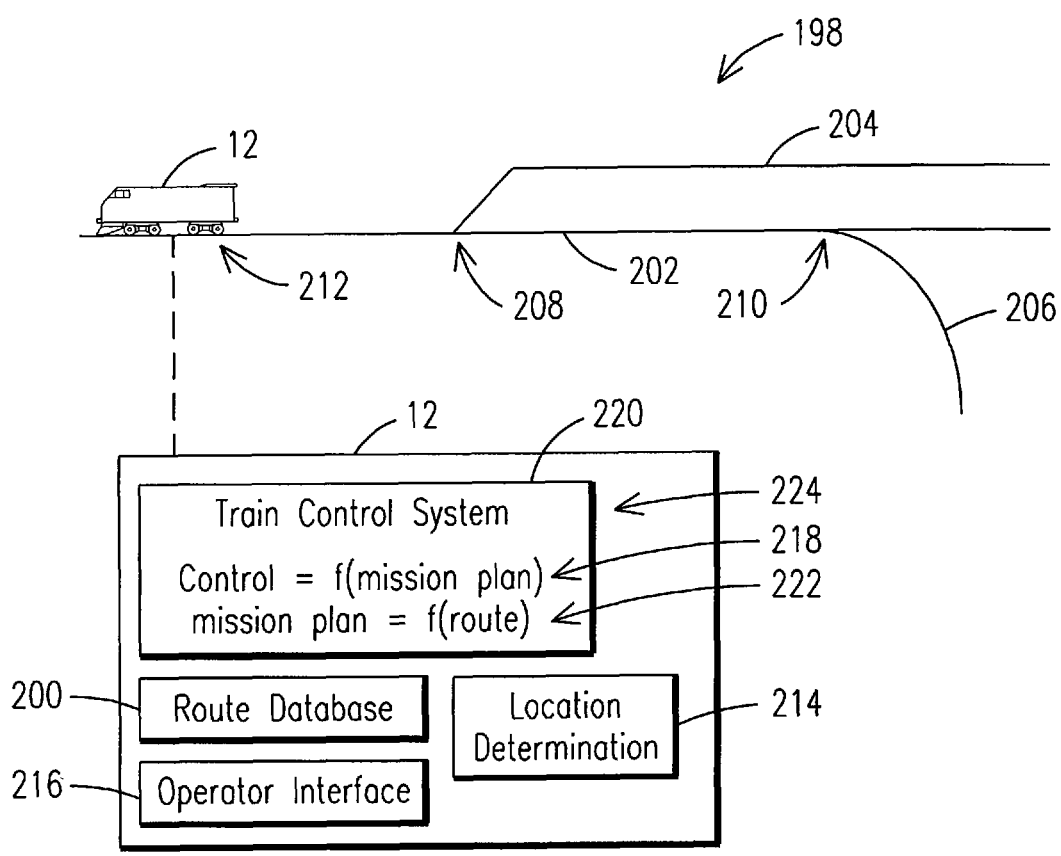
FIG. 14 is a schematic diagram of a control system for a powered system, according to an embodiment of the present invention.

The following illustrates an additional embodiment of a method or system 198 for controlling a powered system, similar to the method of FIG. 7, and with reference to FIG. 14. The system includes a route database 200. The route database comprises information about one or more potential routes 202,204,206 of a powered system 12, including information about route divergence locations 208,210. A route divergence location is a location where the powered system can diverge from a first route to a second route. In the case of a rail vehicle, for example, route divergence information includes the location of a rail switch or crossover, the distance at which the operator could know which track is to be used beyond the switch, the names of the tracks that the train could be routed to beyond the switch, and the control point that contains the switch. As the powered system 12 performs a mission along a route 202 (e.g., travels along the route), the system monitors the status of the powered system 12 relative to the route, e.g., the system monitors the location 212 of the powered system along the route. The location may be determined using a location determination subsystem 214 on board the powered system, such as the GPS receivers 16,18 shown in FIG. 3. The system 198 identifies upcoming route divergence locations 208,210. For example, the system may compare the location 212 of the powered system to the route database 200, to determine if the powered system 12 is approaching a route divergence location 208. This helps to ensure that operator input is solicited at a location in which the operator will know which route will be used. Next, the system 198 forms a query to be posed to the operator of the powered system. The query is formatted in a manner that aligns with powered system operators (e.g., railroad operations) and the operator's knowledge of the routes in the region. For example, in a rail context the system may determine the control point in which the track switch is contained and present the query in terms of the control point. In any event, the query provides the operator with the information required to understand what information is being solicited. Once the system has determined that the train or other powered system is approaching a route divergence location, the system obtains information from the track database necessary to solicit the required information from the operator. The system then solicits the operator for information about whether the powered system 12 will remain on its current route 202 (a first route) or switch to a different route 204 (a second route) at the route divergence location 208. The operator may be solicited by way of an operator interface subsystem 216 on board the powered system 12, e.g., a display and associated data input means such as a keyboard. After the operator has provided input, the system evaluates the input to determine if the route information provided by the operator indicates if the train will deviate from the expected route 202 (e.g., switch from the first route 202 to the second route 204). If the input from the operator indicates that the powered system will change routes (or that the expected route of the powered system is different than its current route), the system uses the operator input to update the expected route. Once a new expected route is determined, information about the new route is obtained (from a route database 200) and used to adjust control of the powered system. For example, a mission plan 218 of the powered system, as implemented by a trip optimizer system or other train control system 220, may be adjusted (as at 222) based on the route information (e.g., speed limits and terrain information) of the new route. The control system 220 controls the powered system based at least in part on the mission plan, as at 224.

Figure 8:
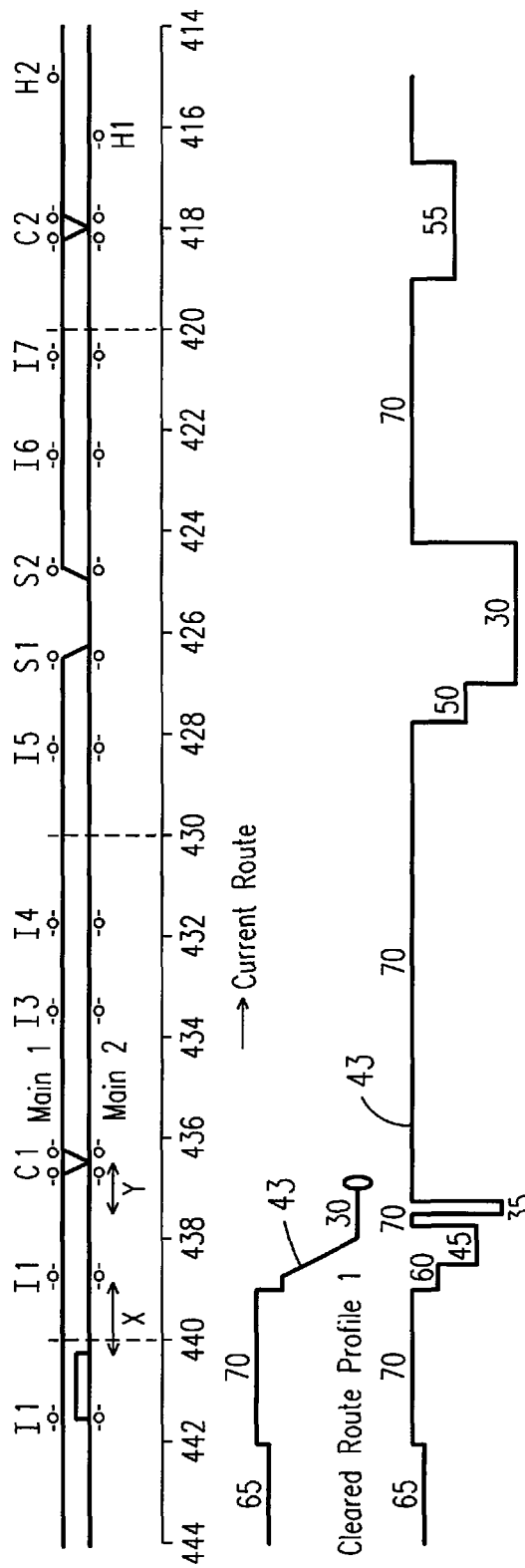
FIG. 8 depicts exemplary information that may displayed to a user when adjusting an existing route based on information received regarding a route divergence.

FIG. 8 illustrates exemplary information that may be displayed to a user. As shown, the route is illustrated with control points (C) identified. Control points are a collection of switches, crossovers, and signals that are interconnected to control movement through a geographic area. Signals (S) are also illustrated. Also displayed is a speed profile 43 where the rail vehicle speed is illustrated as it progresses along the track. When a switch over has occurred the profile speed projection is modified.

As further illustrated in FIG. 8, control points are locations where a train can switch between tracks in multiple track territory. C1, C2, and C3 show various configurations of controls points. The path through a control point is typically indicated to an operator through signal aspect information displayed at the signal prior to the control point. For example, for a train traveling from left to right, the signal S2 will identify the path through C1. If an approach diverging aspect is displayed at a first signal, S2, before the control point, C1, this indicates to the operator that the train will be switching tracks at C1. If a signal clear aspect is displayed to the operator at S2, this indicates that the train will remain on the current track through C1.

In an exemplary embodiment, planning is performed for multiple mission routes, or tracks, as illustrated by the speed profiles. These routes are developed based on the current signal aspects and likely changes to the signal aspects. The cleared route is based on the current signal aspect. In addition, one or more alternate routes are planned based on the possible changes to the signal aspect. In FIG. 8, the cleared route shows the train coming to a stop at CP1. The alternate route shown in FIG. 8 is developed based on the train staying on Main 2 at CP1. Another possible alternate route that is not shown is to switch to Main 1 at CP1.

The train is controlled based on the current route and plans for the alternate routes. By planning for the alternate routes, seamless switch execution to the alternate route is possible if the signal aspect information is received that indicates that the alternate route will be used instead of the current route.

Typically, there are signals between control points, as shown by I3 and I4 between C1 and C2. However, when two control points are close together, there may not be any signals between two control points. In these cases, the signal in the previous control point will identify the path through the next control point.

Figure 9:
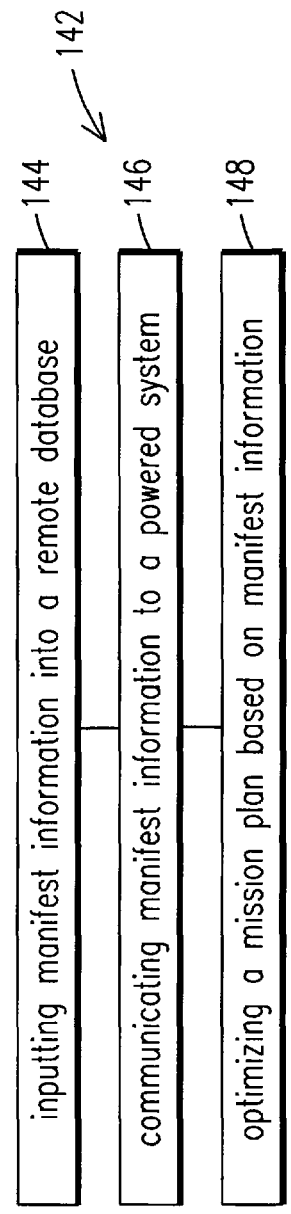
FIG. 9 depicts a flowchart illustrating an exemplary embodiment of a method for providing manifest information to a rail vehicle.

Manifest information for a rail vehicle may be provided in print out form to a crew prior to departure. Having an ability to remotely provide this information so that manifest information is used to optimize a mission plan is desired. As illustrated in the flowchart 142 depicted in FIG. 9, manifest information may be input into a remote database, at 144. The flowchart 142 in FIG. 9 may be a continuation of the flowchart 110 in FIG. 5. The manifest information is information about what the rail vehicle (or other powered system) is carrying, and may include other information about the rail vehicle, such as the unloaded weight or mass of the rail vehicle. For a train, for example, the manifest information may include origin information, destination information, train characteristics (tonnage, length, locomotive IDs, quantity of cars, etc.), and temporary speed restrictions. The information may be communicated directly to a rail vehicle, at 146. This communication may be autonomous, at a predetermined time, or when requested by the operator and/or a trip optimizer system/processor. Communication of the manifest information may be accomplished through either a wired and/or a wireless communication system/process. When the rail vehicle includes a plurality of locomotives, this information may also include fuel usage characteristics and performance information of each locomotive based on the type of locomotives that are part of the train. This information about each locomotive may be coded based on the locomotive identification designation. The mission plan is optimized based on the manifest information, at 148.

Figure 10:
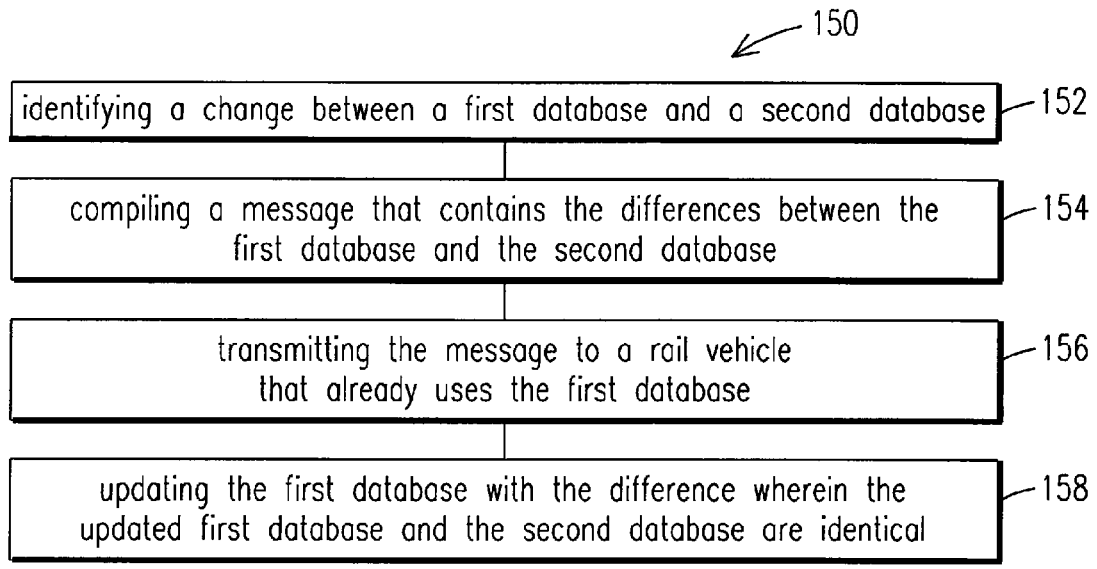
FIG. 10 depicts a flowchart illustrating an exemplary embodiment of a method for approach where only updates to a database are transmitted for inclusion in a currently used database.

Situations arise where only parts or segments of a route (or track) database that resides on the rail vehicle need updating. FIG. 10 depicts a flowchart 150 illustrating an exemplary approach where only updates to a database are transmitted for inclusion in a currently used database. As illustrated, a determination is made as to changes, or deltas, between two track databases where a first database is identical to the database currently used on a rail vehicle and the second database is a newer version, at 152. In one embodiment, this determination may be performed with an off-board system. When performed with the off-board system, the changes are compiled in a message, at 154, and are then sent to the rail vehicle, at 156. The database on the rail vehicle is then updated with the changes, at 158. More specifically, a processor on the rail vehicle reads the files that contain changes. For each record that is marked as new, a new data object is created. For each record that is marked as modified, the old object is removed and a new one is created. For each record that is marked as deleted, the object is removed. The method shown in flowchart 150 may be performed with a computer software code having computer software modules where the computer software code is stored on computer media and is executed with a processor. For example, the processor may be one configured to specifically handle track database processing including maintaining and verifying integrity of the track database.

Figure 11:
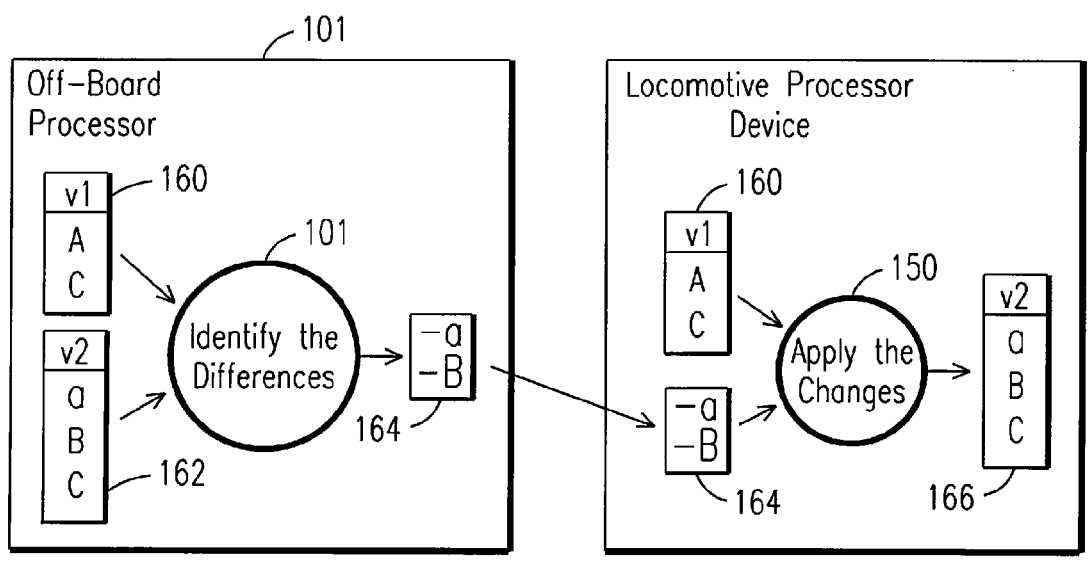
FIG. 11 depicts a block diagram of how a database is updated.

FIG. 11 depicts a block diagram of how the database is updated. As illustrated, the original database 160, "v1," included only objects A and C. The revised database 162, "v2," includes a, B, and C. An off-board processor 101, typically located at a remote facility, identifies the differences 164 in the databases. The differences 164 are transferred to the processor 36, 38 and/or memory device 37, 39 aboard the locomotive 12 that maintains the track database, including instructions about whether the differences 164 are additions or replacements to existing objects in the database. Implementing the method of flowchart 150 disclosed in FIG. 10, the on-board database is reconfigured wherein the updated version of the track database 166 includes versions a, B, and C.

Figure 12:
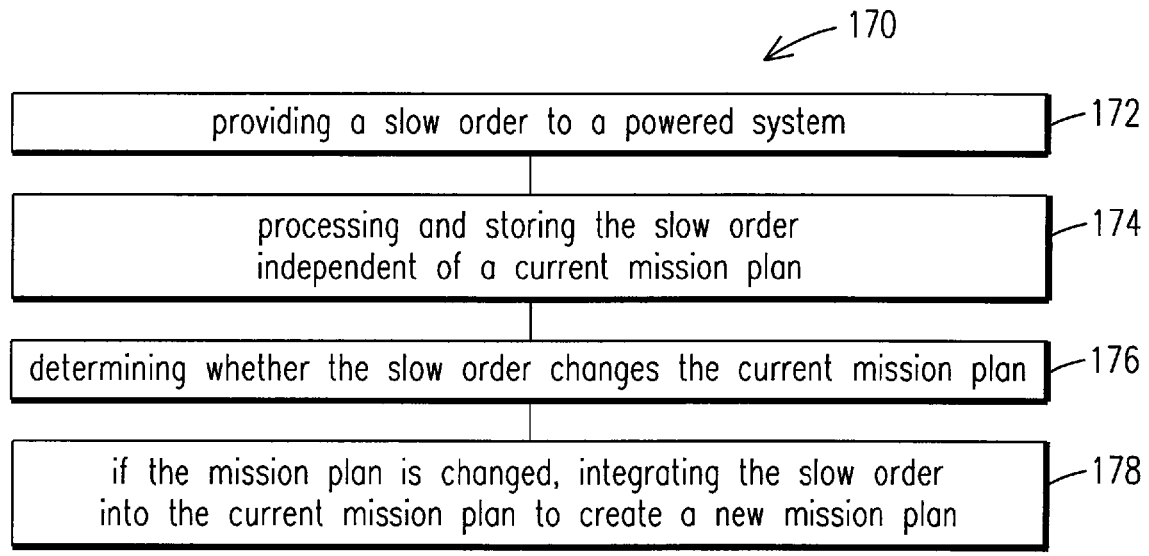
FIG. 12 depicts a flowchart illustrating a method for associating a slow order to a trip route of a rail vehicle.

FIG. 12 depicts a flowchart illustrating a method for associating a slow order to a trip route of a rail vehicle. As illustrated in the flowchart 170, a slow order is communicated to the rail vehicle, at 172. In an exemplary embodiment, all slow orders are provided at the start of the mission, though such orders may also be communicated during a mission, such as when a condition on a route changes. The slow order is processed and stored aboard the rail vehicle, independent of a current mission plan, or mission route, at 174. A determination is made whether the slow order will change the current mission plan, at 176. If the mission plan will change because of the slow order, the slow order is integrated into a current mission plan to create a new mission plan, at 178. The method of flowchart 170 may be performed with a computer software code having computer software modules where the computer software code is stored on computer media and is executed with the processor 36, 38. For example, the processor may be one configured to specifically handle track database processing including maintaining and verifying integrity of the track database.

Figure 13:
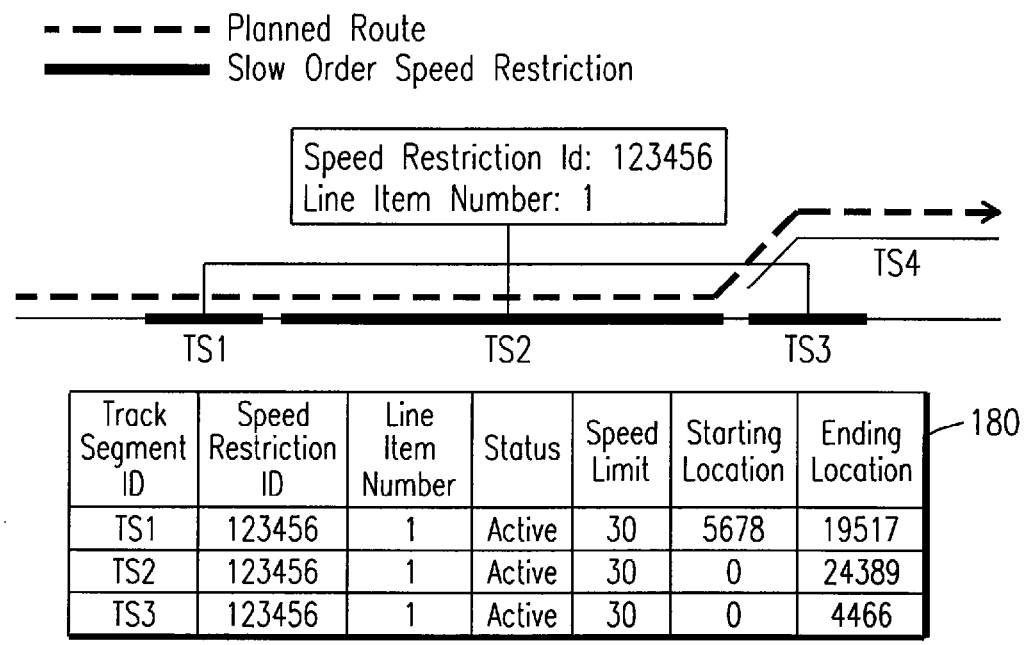
FIG. 13 depicts an illustration of an exemplary embodiment of how a slow order is applied to a mission.

Utilizing the method of flowchart 170 illustrated in FIG. 12 allows for a trip optimizer system/approach/method to be fully automatic during motoring. Thus the operator will not have to manually disable the trip optimizer system in slow order zones along the mission route. FIG. 13 depicts an illustration of an exemplary embodiment of how a slow order 180, represented by a chart illustrating slow orders for several mission segments, is applied to a mission when planning the route and/or while the rail vehicle is motoring along the mission route. As illustrated, the slow order may affect a part of the mission segment TS1. The slow order may also affect mission segment TS2 and TS3. However if a divergent segment (where the route is changed) is used, TS4, the slow order does not affect this mission segment since no slow orders for this part of the route were provided and the slow order for TS3 is associated only with TS3.

Information about optimized missions plans and adjusting optimized mission plans can be found in commonly assigned U.S. Publication No. 2007-0219680 A1, dated Sep. 20, 2007, which is incorporated herein by reference in its entirety.

With reference to FIG. 16, an additional embodiment of the present invention relates to a control system 198 for a powered system 12. The control system 198 comprises a first subsystem 214 configured to determine a location of the powered system along a current route 202 of the powered system 12. The control system further comprises a second subsystem (e.g., 200,214) configured to determine when the powered system is approaching a route location 208 where the powered system can change from the current route 202 to a new route 204. For example, the second subsystem may comprise the first subsystem 214 in combination with a route database 200, wherein the route database contains information about route divergence locations 208,210, and wherein the first subsystem 214 determines if the powered system is approaching a route divergence location by comparing the determined location of the powered system to the route database 200. The control system further comprises a third subsystem 216 configured to determine whether the powered system will be changing from the current route 202 to the new route 204, and a fourth subsystem 220 configured to adjust a mission plan 218 of the powered system based on route data of the new route 204, as at 222, if it is determined that the powered system will be changing from the current route 202 to the new route 204. The powered system is controlled based at least in part on the mission plan, as at 224. The third subsystem 216 may include an operator interface, with an operator query being displayed to the operator for soliciting operator input of whether the powered system will switch from a current route 202 to a new route 204,206.

As indicated in FIG. 16, the train control system 220 (e.g., automatic speed control, trip optimizer system, distributed power control system) controls the train 12, as at 224, as a function of a mission plan 218. The train may be controlled based on other factors in addition or alternatively. The mission plan 218, as indicated at 222, is partially a function of the route 202 on which the train is traveling. The control structure of FIG. 16 is applicable to other powered systems.

An additional embodiment of the present invention relates to a system 198 for controlling a powered system 12. The system includes a subsystem 214 configured to determine a specific location 212 of the powered system 12 along a first mission route 202. The subsystem is further configured to determine, based on the determined specific location 212 of the powered system, when the powered system is approaching a location 208 where the powered system is able to change from the first mission route 202 to a second, different mission route 204.

In another embodiment, the system 198 further comprises a controller 220 configured to control the powered system 12. The system further comprises a processor 36 configured to provide control commands to at least one of the controller 220 and an operator of the powered system. The processor is configured, by way of computer-readable instructions, to evaluate mission route changes, manifest information provided from a remote location, and a change to a mission route database 200, for determining a mission plan 218 that is optimized to provide for reduced emissions output and/or reduced fuel consumption. The controller 20 controls the powered system in response to a change in the mission route, e.g., the powered system is controlled based on a mission plan adjusted due to a change in the mission route.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method comprising:
one or more processors operating a rail vehicle to travel during a trip according to a trip plan that dictates one or more routes the rail vehicle is to travel along during a trip to reach one or more destination locations, the trip plan also dictating operational settings to be used by the rail vehicle during the trip, the trip plan based on the rail vehicle traveling over the one or more routes, the operational settings including at least one of propulsion commands or braking commands;
identifying, by the one or more processors, when the rail vehicle is approaching a divergence point in the trip where the rail vehicle may change from traveling over the one or more routes dictated by the trip plan to traveling over a different route that diverges from the one or more routes dictated by the trip plan and that is not included in the one or more routes dictated by the trip plan;
the one or more processors receiving information about whether the rail vehicle will diverge from the one or more routes dictated by the trip plan and travel onto the different route that is not dictated by the trip plan; and
the one or more processors adjusting the trip plan responsive to the rail vehicle leaving the one or more routes dictated by the trip plan and traveling onto the different route that diverges from the one or more routes dictated by the trip plan, the trip plan adjusted to direct the rail vehicle to travel to the one or more destination locations using at least the different route that diverges from the one or more routes previously dictated by the trip plan and to decrease at least one of fuel consumed or emissions generated by the rail vehicle during travel along the different route to the destination location relative to traveling along at least the different route to the one or more destination locations according to another, different plan other than the trip plan that is adjusted.

2. The method according to claim 1, wherein adjusting the trip plan further comprises:
saving route divergence data in a route database, the route divergence data representative of the rail vehicle diverging from the one or more routes dictated by the trip plan and travelling onto the different route that diverges from the one or more routes dictated by the trip plan during execution of the trip plan;
identifying a future potential route divergence occurrence, the future potential route divergence occurrence representing an upcoming location where another route that diverges from the trip plan that was adjusted or the route that the vehicle is currently travelling; and
updating the trip plan to include the future potential route divergence.

3. The method according to claim 1, further comprising
providing information about a manifest associated with the rail vehicle, wherein the information is provided from a remote location to the rail vehicle, for use by the rail vehicle in determining the trip plan, and
wherein providing information about the manifest further comprises maintaining manifest information in a database at the remote location, and
communicating the manifest information to the rail vehicle for use in determining the trip plan.

4. The method according to claim 1, further comprising providing a route database on the rail vehicle that is used to determine the trip plan.

5. The method according to claim 4, further comprising updating the route database with at least one change to the route database that is provided from a remote location.

6. The method according to claim 1, further comprising:
evaluating a temporary change in travel of the rail vehicle that contradicts the trip plan and that is received from a remote location; and
adjusting the trip plan based on the temporary change, when the temporary change affects the trip plan.

7. The method according to claim 6, further comprising:
storing the temporary change; and
evaluating the temporary change against the trip plan when the trip plan is adjusted based on the route change.

8. The method according to claim 1, wherein the one or more routes dictated by the trip plan comprise one or more tracks as used by the rail vehicle.

9. The method according to claim 1, wherein the information is received from at least one of an onboard operator of the rail vehicle or from an off-board source.

10. The method according to claim 9, further comprising:
soliciting an operator of the rail vehicle for the information about whether the one or more routes dictated by the trip plan or a different route that diverges from the one or more routes dictated by the trip plan and that is not included in the one or more routes dictated by the trip plan will be taken, and wherein the information is obtained from the operator.

11. The method according to claim 9, wherein the rail vehicle is restricted to traveling along the trip only on tracks having fixed positions and divergence points that include the one or more routes dictated by the trip plan and the different route that is not dictated by the trip plan, and wherein receiving information from an operator or an off-board source includes receiving input indicative of the rail vehicle deviating from the route that was dictated by the trip plan and travelling onto the different route that diverges from the route that was dictated by the trip plan.

12. A system comprising:
a subsystem comprising one or more processors configured to determine one or more destination locations of a rail vehicle traveling according to a trip plan, the trip plan dictating one or more routes the rail vehicle is to travel along during a trip to reach the one or more destination locations, the trip plan including one or more operational settings of the rail vehicle to reduce at least one of fuel consumed or emissions generated by the rail vehicle relative to traveling according to another, different plan other than the trip plan, the operational settings including at least one of propulsion commands or braking commands;
wherein the subsystem is further configured to determine, when the rail vehicle is approaching a divergence point in the trip where the rail vehicle may change from travelling over the one or more routes dictated by the trip plan to travelling over a different route that diverges from the one or more routes dictated by the trip plan and is not included in the one or more routes dictated by the trip plan; and
wherein the one or more processors of the subsystem is further configured to receive information about whether the rail vehicle will diverge from the one or more routes dictated by the trip plan and travel onto the different route that is not dictated by the trip plan, the subsystem also configured to modify the trip plan responsive to the rail vehicle leaving the one or more routes dictated by the trip plan and travelling onto the different route that diverges from the one or more routes dictated by the trip plan in order to reduce the at least one of fuel consumed or emissions generated by the rail vehicle as the rail vehicle travels along the different route to the one or more destination location relative to traveling along the along the second, different route relative to traveling according to another, different plan other than the trip plan that is modified.

13. The system according to claim 12, further comprising:
a controller configured to control the rail vehicle;
one or more processors configured to provide control commands to at least one of the controller or the operator of the rail vehicle; and
computer-readable instructions that, when executed by the one or more processors, cause the one or more processors to evaluate a trip route change, manifest information provided from a remote location, and a change to a route database, for determining the trip plan;
wherein the controller controls the rail vehicle in response to the rail vehicle moving from one or more routes dictated by the trip plan to travelling over a different route that diverges from the one or more routes dictated by the trip plan and that is not included in the one or more routes dictated by the trip plan.

14. The system according to claim 12, wherein the one or more routes dictated by the trip plan comprise a track as used by the rail vehicle.

15. The system according to claim 12, further comprising a memory device configured to store at least one of route divergence information, temporary changes to the route divergence information, or manifest information.

16. The system according to claim 12, wherein the information is received from at least one of an onboard operator of the rail vehicle or from an off-board source.

17. The system according to claim 16, wherein the rail vehicle is restricted to traveling along the trip only on tracks having fixed positions and divergence points that include the one or more routes dictated by the trip plan and the different route that is not dictated by the trip plan, and the subsystem is configured to receive information from at least one of an operator or an off-board source that is indicative of the rail vehicle deviating from the route that was dictated by the trip plan and travelling onto the different route that diverges from the route that was dictated by the trip plan.

18. A computer software code stored on a non-transitory computer readable media and executable with one or more processors for controlling a rail vehicle, the computer software code configured to direct the one or more processors to:
operate the rail vehicle to travel in a trip based on a trip plan that dictates one or more routes the rail vehicle is to travel along during a trip to reach one or more destination locations, the trip plan dictates operational settings for the rail vehicle that reduce at least one of fuel consumed or emissions generated by the rail vehicle during the trip relative to the rail vehicle operating according to another, different plan other than the trip plan, the operational settings including at least one of propulsion commands or braking commands;
identify, by the one or more processors, when the rail vehicle is approaching a divergence point in the trip where the rail vehicle may change from traveling over the one or more routes dictated by the trip plan to travelling over a different route that diverges from the one or more routes dictated by the trip plan and that is not included in the one or more routes dictated by the trip plan;
the one or more processors receive information about whether the rail vehicle will diverge from the one or more routes dictated by the trip plan and travel onto the different route that is not dictated by the trip plan; and
adjust, by the one or more processors, the trip plan responsive to the rail vehicle leaving the one or more routes dictated by the trip plan and travelling onto the different route that diverges from one or more routes dictated by the trip plan, the trip plan adjusted to direct the rail vehicle to travel to the one or more destination locations using at least the different route that diverges from the one or more routes previously dictated by the trip plan and to reduce the at least one of fuel consumed or emissions generated by the rail vehicle during travel along the different route to the destination location relative to travelling along the different route to the one or more destination locations according to another, different plan other than the trip plan that is adjusted.

19. The computer software code according to claim 18, wherein the computer software code is configured to direct the one or more processors to update a route database disposed onboard the rail vehicle with at least one change to the route database that is realized at a remote location.

20. The computer software code according to claim 18, wherein the information is received from at least one of an onboard operator of the rail vehicle or from an off-board source.

21. The computer software code according to claim 20, wherein the computer software code is configured to direct the one or more processors to adjust the trip plan with information about a route divergence that is received from an operator or an off-board source.

22. The computer software code according to claim 20, wherein the computer software code is configured to direct the one or more processors to evaluate a temporary change against the trip plan communicated from an off-board source and adjust the trip plan based on the temporary change when the temporary change affects the trip plan.

23. The computer software code according to claim 20, wherein the rail vehicle is restricted to traveling along the trip only on tracks having fixed positions and divergence points that include the one or more routes dictated by the trip plan and the different route that is not dictated by the trip plan, and the one or more computer software modules are configured to receive information from at least one of an operator or an off-board source as input that is indicative of the rail vehicle deviating from the route that was dictated by the trip plan and travelling onto the different route that diverges from the route that was dictated by the trip plan.

* * * * *